P. A. H. MOSSAY.
DYNAMO ELECTRIC MACHINE.
APPLICATION FILED JAN. 30, 1918.

1,320,781.

Patented Nov. 4, 1919.
2 SHEETS—SHEET 1.

Inventor
Paul A. H. Mossay

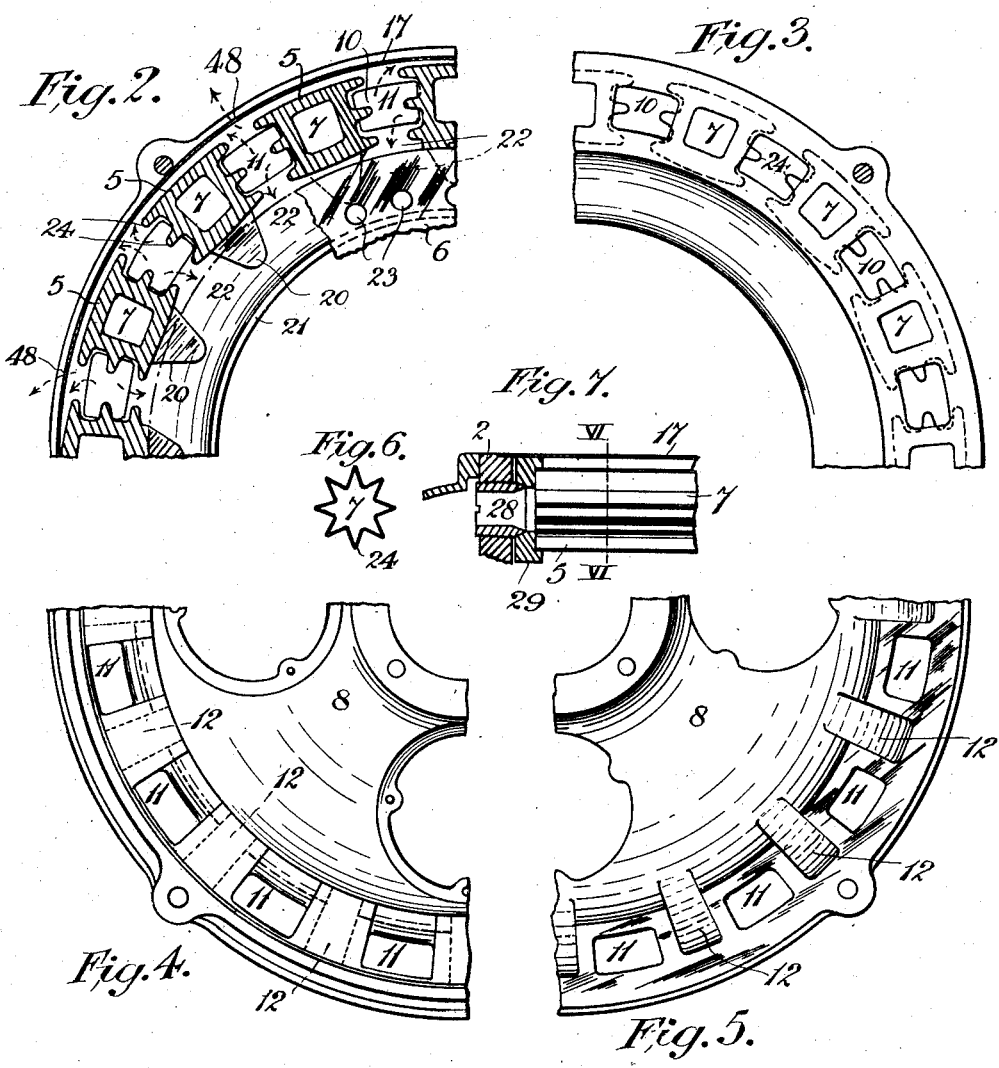

UNITED STATES PATENT OFFICE.

PAUL ALPHONSE HUBERT MOSSAY, OF LONDON, ENGLAND.

DYNAMO-ELECTRIC MACHINE.

1,320,781.  Specification of Letters Patent.  Patented Nov. 4, 1919.

Application filed January 30, 1918. Serial No. 214,441.

*To all whom it may concern:*

Be it known that I, PAUL ALPHONSE HUBERT MOSSAY, a subject of the King of the Belgians, residing at London, England, have invented certain new and useful Improvements in Dynamo-Electric Machines, of which the following is a specification.

Dynamo electric machines which are intended to be used in dusty, explosive or other deleterious atmospheres are usually provided with totally inclosed casings. In order to avoid undue heating of the field and armature, resulting in a lowering of the electrical efficiency of the machine, many attempts have been made to cool the machine by blowing cold air on to the outside of the casing by means of fans, or by circulating the internal hot air through external radiators or coolers. The attempts of the first mentioned class have only been partly successful owing to the insufficient area of radiating or conductive surface of the casing, whereas in the attempts of the second mentioned class the increased radiating surface is only obtained by a cumbersome constructional addition which considerably increases the cost of the machine and the space occupied.

Moreover, in one known instance in an attempt of the first mentioned class where an increased area of the casing for an alternating current machine was sought to be obtained by corrugating it, the heat from the stator laminæ, which was not conducted through those parts of the metal casing which happened to be in contact with them, was insulated from the exterior cool walls of the casing by the hot internal air circulated between the laminæ and the corrugated casing.

The object of the present invention is to increase the cooling efficiency (and thereby to maintain a high electrical efficiency) by enabling the external cooling fluid, which is excluded from the internal parts of the machine, to make direct contact with the field magnet ring (usually a casting in a direct current machine and laminæ in the case of an alternating current machine) and also to insure effective contact between the external cooling fluid and the walls of channels or ducts through which the internal hot air is circulated.

With this object in view the invention consists in an inclosed dynamo electric machine having a casing provided with distinct series of channels so arranged that external cooling fluid passing through one series of channels makes direct contact with the magnet ring or stator laminæ and with the walls of channels of the other series through which the internal hot air is circulated.

The conditions are, therefore, such that not only can the internal hot air carry away heat from the internal parts of the machine, such as the stator winding, and give it up easily to the exterior or to the cooling fluid, but heat generated in the magnet ring is immediately carried away by the cooling fluid in direct contact with the ring. By-pass passages may be provided to direct some of the cooling fluid through channels passing the stator laminæ in an alternating current machine, so that the heat from the hottest parts may be carried away rapidly. In this respect it is to be understood that no general claim is made to the feature of blowing air through holes in the stator laminæ of an inclosed motor.

The invention further comprises means for facilitating cleaning of the cooling channels for the external cooling fluid, and details in the construction of the casing and end shields hereinafter referred to.

In the accompanying drawings:—

Figure 1 is a sectional elevation illustrating one form of the invention as embodied in a three phase alternating current motor cooled by air, the upper half of the figure being a section taken through one of the hot air channels, and the lower half being partly an exterior view with the removable cover omitted, and partly a section through one of the end shields showing an opening for cold fluid, the paths of the hot and cold air being indicated by arrows in full and dotted lines respectively.

Fig. 2 is a sectional end view of a fragment of the channeled casing with a fragment of the stator laminæ in position.

Fig. 3 is an end view of a fragment of the channeled casing.

Figs. 4 and 5 are, respectively, an outside and an inside view of a fragment of one of the end shields.

Figs. 6 and 7 are detail sectional views of a modified form of hot air channel, Fig. 6 being a section on VI—VI, Fig. 7.

In the various figures similar reference numerals represent corresponding parts.

Figure 1:
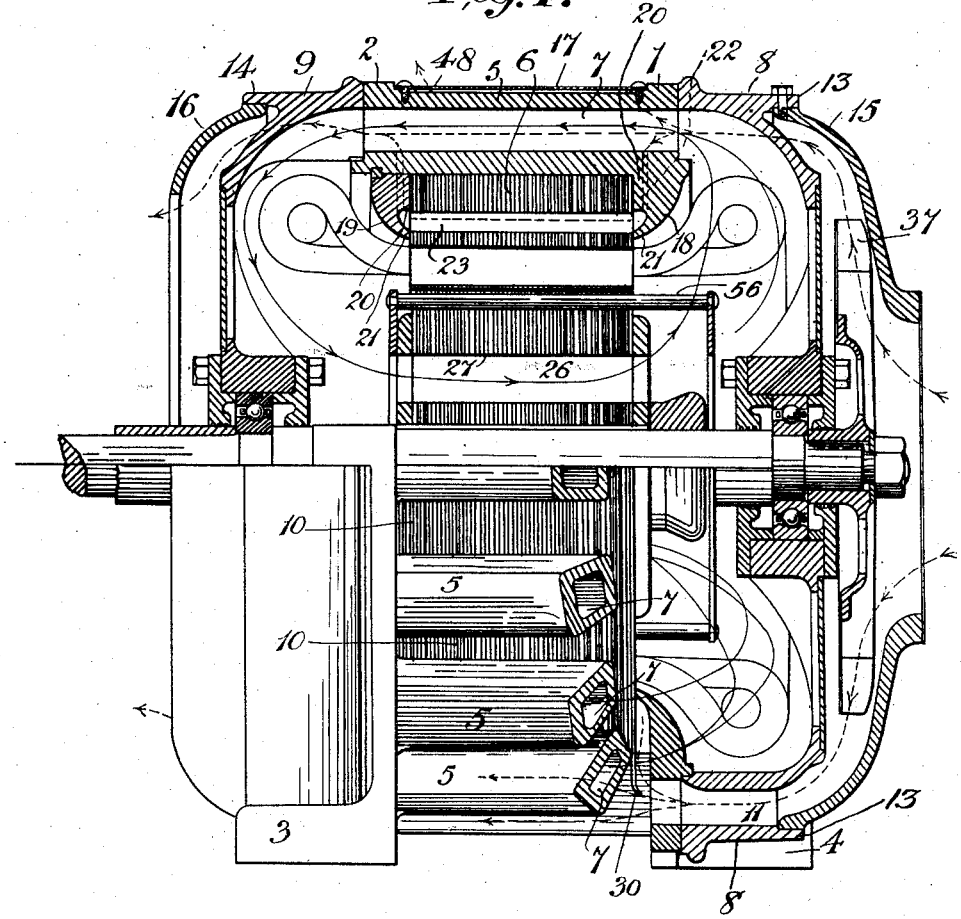

In the form of the invention illustrated by Figs. 1 to 5, two rings 1, 2, are cast with feet 3, 4, to form the main or end frames of the machine, the rings being spaced apart and connected by a number of ribs 5. The rings 1, 2, and the ribs 5 may be cast integrally as shown in Figs. 1 to 3. The stator laminæ 6 are placed in the space encircled by these ribs and suitably clamped together. The ribs 5 are cast hollow to form one series of transverse channels 7 which are placed in communication with the interior of the machine by two end shields 8 and 9. The spaces 10 between the ribs 5 form a second series of transverse channels, and holes 11, Fig. 4, in the end shields co-incident with the ends thereof enable the channels 10 to communicate with the outside of the shields. The end shields are conveniently cast with the flutings 12 which together with the holes 11 alternately form the connections between the two series of channels 7 and 10 and the inside and outside of the end shields. The shields have cylindrical extensions 13, 14, and end covers 15, 16. A fan 37 is fitted in the space formed between the cover 15 and shield 8, the fan being adapted to draw in air from outside and propel it through the holes 11 in the shield 8, thence through the outer series of channels 10 and finally through the holes 11 in the shield 9 to the outside. The channels 10 are covered by an outer light cylindrical cover or casing 17 which may be removable to facilitate cleaning of the outer series of channels. If desired small holes may be formed in the cover 17 to permit some of the cooling air to pass out as indicated at 48.

The rings 1 and 2 are also provided with two internal flanges 18, 19, embracing the ends of the field laminæ 6, the flange 19 being preferably removable and the flange 18 cast integrally with the ring 1. The flanges 18, 19, have a number of lugs 20 (Fig. 2) against which the end laminæ abut. The lugs 20 are flush with the inturned lips 21, on the flanges. By this arrangement by-pass passages 22, from the cold air channels 10 are formed, communicating with holes or channels 23, running through the laminæ 6 in close proximity to the winding slots i. e. the hottest parts of the field.

The air inclosed within the casing is caused to circulate by the rotation of the armature the path being indicated by the arrows in full lines in Fig. 1. The bars 56 extend farther on one side of the armature than on the other, so that they set up a fan action. The armature laminæ 27 have holes forming channels 26.

From the above it will be understood that the hot air inclosed in the casing is circulated in a closed cycle through the channels 26 in the armature and one series of channels 7 formed by the hollow ribs 5, while cold air from an outside source, as indicated by the arrows in dotted lines in Fig. 1, is partly passed through the adjacent or outer series of channels 10 to cool the hot air by conduction through the walls of the cells 7, and also the external parts of the laminæ 6, and partly by-passed through the flanges 18, 19, and the channels 23 in the field laminæ 6 to carry away heat from the sides and the hottest parts of the laminæ. Baffles 30 may be provided to induce a flow of air through the by-pass passages.

The hollow ribs 5 may be formed with radiating ribs 24, Figs. 2 and 3, to increase the contact surface, and as only a few are used to support the field laminæ the majority may be made, if desired, of sheet metal suitably corrugated or otherwise bent or pressed to form the two series of channels. The sheet metal tubes may be provided with gills or, as illustrated in Figs. 6 and 7, the sheet metal tubular ribs 5 may have several folds or auxiliary ribs or plaitings to increase the cooling surface. The ribs so formed may be clamped between the end frames or rings 1, 2, by screwed ferrules 28, engaging within end caps 29 cast on or otherwise secured to tubes 5.

The cold air and hot internal air may be circulated through their respective channels in the same or in opposite directions, the direction of flow depending, as is well known in the art, on the inclinations of the fan blades in relation to the direction of rotation.

The term dynamo electric machine is used in the general sense adopted in the art to include generators, motors, motor generators, or motor converters, or like electrical machines.

I claim:—

1. An inclosed dynamo electric machine having a casing provided with separate series of channels one series for the passage of cooling fluid and the other series for the circulation within the machine of the internal hot air, the channels for the cooling fluid being adapted to permit of the cooling fluid making direct contact with the magnet ring and with the walls of the hot air channels.

2. An inclosed dynamo electric machine having a casing provided with separate channels for the passage of cooling fluid and for the internal hot air, whereby the hot air in its passage through its channels is insulated from the interior of the machine by cooling fluid which in its passage through its channels is in direct contact with the magnet ring.

3. An inclosed dynamo electric machine having a casing, provided with separate channels for the passage of cooling fluid and for internal hot air, the said hot air channels being in the form of hollow ribs situated between the end frames of the machine and passing within channels for cooling fluid.

4. An inclosed dynamo electric machine having a casing provided with separate channels for the passage of cooling fluid and for internal hot air, and end shields each having separate ducts passing alternately to the interior and exterior and communicating respectively with the hot air channels and the channels for cooling fluid.

5. An inclosed dynamo electric machine having a casing provided with separate channels for the passage of cooling fluid and for internal hot air, and end frames, the said hot air channels being in the form of hollow ribs situated between the end frames of the machine, and end shields adjacent to said end frames, said end shields each having separate series of ducts passing alternately to the interior and exterior and communicating respectively with the hot air channels and the channels for cooling fluid.

6. An inclosed alternating current electric machine having a laminated magnet ring, a casing surrounding said ring comprising end frames and hollow ribs between said frames, an outer cover surrounding said ribs, forming with said magnet ring a channel for cooling fluid, means for circulating the internal hot air of the machine through said hollow ribs, and means for passing cooling fluid through said channel.

7. An inclosed alternating current electric machine having a laminated magnet ring, a casing surrounding said ring comprising end frames and hollow ribs between said frames, said hollow ribs having radiating gills to increase their radiating surface, an outer cover surrounding said ribs, forming with said magnet ring a channel for cooling fluid, means for circulating the internal hot air of the machine through said hollow ribs, and means for passing cooling fluid through said channel.

8. An inclosed alternating current electric machine having a laminated magnet ring, a casing surrounding said ring comprising end frames and hollow ribs between said frames, an outer cover surrounding said ribs, forming with said magnet ring a channel for cooling fluid, by-pass passages in said magnet ring communicating with said channel, means for circulating the internal hot air of the machine through said hollow ribs, and means for passing cooling fluid through said channel and through said by-pass passages.

In testimony whereof I have signed my name to this specification in the presence of two subscribing witnesses.

PAUL ALPHONSE HUBERT MOSSAY.

Witnesses:
H. MATHYS,
A. W. MATHYS.